US00RE50127E

(19) United States
(12) Reissued Patent
Yahner

(10) Patent Number: US RE50,127 E
(45) **Date of Reissued Patent: *Sep. 17, 2024**

(54) OPERATOR RIDE ENHANCEMENT SYSTEM

(71) Applicant: The Raymond Corporation, Greene, NY (US)

(72) Inventor: Joseph Thomas Yahner, Chenango Forks, NY (US)

(73) Assignee: The Raymond Corporation, Greene, NY (US)

( * ) Notice: This patent is subject to a terminal disclaimer.

(21) Appl. No.: 17/706,086

(22) Filed: Mar. 28, 2022

Related U.S. Patent Documents

Reissue of:
(64) Patent No.: 8,991,904
Issued: Mar. 31, 2015
Appl. No.: 14/089,021
Filed: Nov. 25, 2013

U.S. Applications:
(63) Continuation of application No. 16/813,414, filed on Mar. 9, 2020, now Pat. No. Re. 48,991, which is a continuation of application No. 15/476,767, filed on Mar. 31, 2017, now Pat. No. Re. 47,899, which is an application for the reissue of Pat. No. 8,991,904, which is a continuation of application No. 13/091,237, filed on Apr. 21, 2011, now Pat. No. 8,616,603.

(60) Provisional application No. 61/327,434, filed on Apr. 23, 2010.

(51) Int. Cl.
*B62D 51/02* (2006.01)
*B62D 33/06* (2006.01)
*B66F 9/075* (2006.01)

(52) U.S. Cl.
CPC ..... *B62D 51/02* (2013.01); *B62D 33/0604* (2013.01); *B66F 9/0759* (2013.01)

(58) Field of Classification Search
CPC .... B62D 33/0604; B62D 51/02; B62D 33/06; B62D 37/04; B66F 9/0759
See application file for complete search history.

(56) References Cited

U.S. PATENT DOCUMENTS 3,029,088 A * 4/1962 Loef ..... B62D 49/085 280/62
5,109,939 A * 5/1992 Conaway et al. ..... 180/89.15
5,116,188 A * 5/1992 Kurohashi et al. ..... 414/719
5,131,802 A * 7/1992 Sunami et al. ..... 414/719
5,230,398 A * 7/1993 Frisbee ..... 180/90
5,253,853 A * 10/1993 Conaway et al. ..... B60G 99/00 248/564
5,579,859 A * 12/1996 Quellhorst et al. ..... B62D 33/0604 248/638

(Continued)

*Primary Examiner* — William C Doerrler
(74) *Attorney, Agent, or Firm* — Quarles & Brady LLP

(57) ABSTRACT

An operator ride enhancement system that is coupleable to the frame of a vehicle includes a counterweight platform moveably coupled to the frame, and a resilient member engaged with the frame and the counterweight platform. The mass of the counterweight platform is configured to be approximately at least equal to a total mass supported by the counterweight platform during operation of the vehicle. The operator ride enhancement system attenuates and/or inhibits movement of the counterweight platform during operation of the vehicle.

20 Claims, 8 Drawing Sheets

(56) References Cited

U.S. PATENT DOCUMENTS 5,685,555 A * 11/1997 McCormick ..... F16F 7/082 280/124.1
5,833,268 A * 11/1998 Aldrovandi ..... 280/759
5,918,693 A * 7/1999 Mantovani et al. ..... 180/89.13
5,964,310 A * 10/1999 Gyllner ..... 180/89.13
5,984,050 A * 11/1999 Ronald ..... 187/226
6,137,398 A * 10/2000 Dunlap et al. ..... B66F 17/003 340/439
6,206,121 B1 * 3/2001 Michel ..... 180/89.13
6,241,263 B1 * 6/2001 Hicks ..... 280/6.154
6,257,645 B1 * 7/2001 Kraimer et al. ..... 296/97.23
6,623,080 B2 * 9/2003 Clapper ..... 297/452.41
6,719,258 B2 * 4/2004 Bryngelson et al. ..... 248/419
6,773,002 B2 * 8/2004 Adoline et al. ..... 267/168
6,935,693 B2 * 8/2005 Janscha et al. ..... 297/344.15
6,988,560 B2 * 1/2006 Bay ..... 172/272
7,097,186 B2 * 8/2006 Uematsu et al. ..... 280/124.112
7,152,842 B1 * 12/2006 Monson et al. ..... 248/678
7,300,092 B2 * 11/2007 Dunn ..... 296/70
7,337,864 B2 * 3/2008 Ruck ..... 180/89.13
7,497,505 B2 * 3/2009 Manci et al. ..... 296/190.01
7,673,931 B2 * 3/2010 Takano et al. ..... 296/190.01
7,744,149 B2 * 6/2010 Murray et al. ..... 296/190.07
7,823,961 B2 * 11/2010 Manci et al. ..... 296/190.01
8,096,608 B2 * 1/2012 Andou et al. ..... 296/190.05
8,616,603 B2 * 12/2013 Yahner ..... 296/1.03
RE47,899 E * 3/2020 Yahner ..... B66F 9/0759
RE48,991 E * 3/2022 Yahner ..... B62D 33/0604
2005/0095104 A1 * 5/2005 Bay ..... 414/500
2006/0255622 A1 * 11/2006 Manci et al. ..... 296/190.01
2006/0266573 A1 * 11/2006 Ishii et al. ..... 180/326
2009/0038186 A1 * 2/2009 Osswald et al. ..... 37/413
2009/0045000 A1 * 2/2009 Brown ..... 180/89.12
2010/0290883 A1 * 11/2010 Kitatani et al. ..... 414/719
2011/0001335 A1 * 1/2011 Jones et al. ..... 296/190.01
2011/0017537 A1 * 1/2011 Andou et al. ..... 180/89.16
2011/0260502 A1 * 10/2011 Yahner ..... 296/190.07
2014/0084616 A1 * 3/2014 Yahner ..... 296/1.03

* cited by examiner

FIG. 1
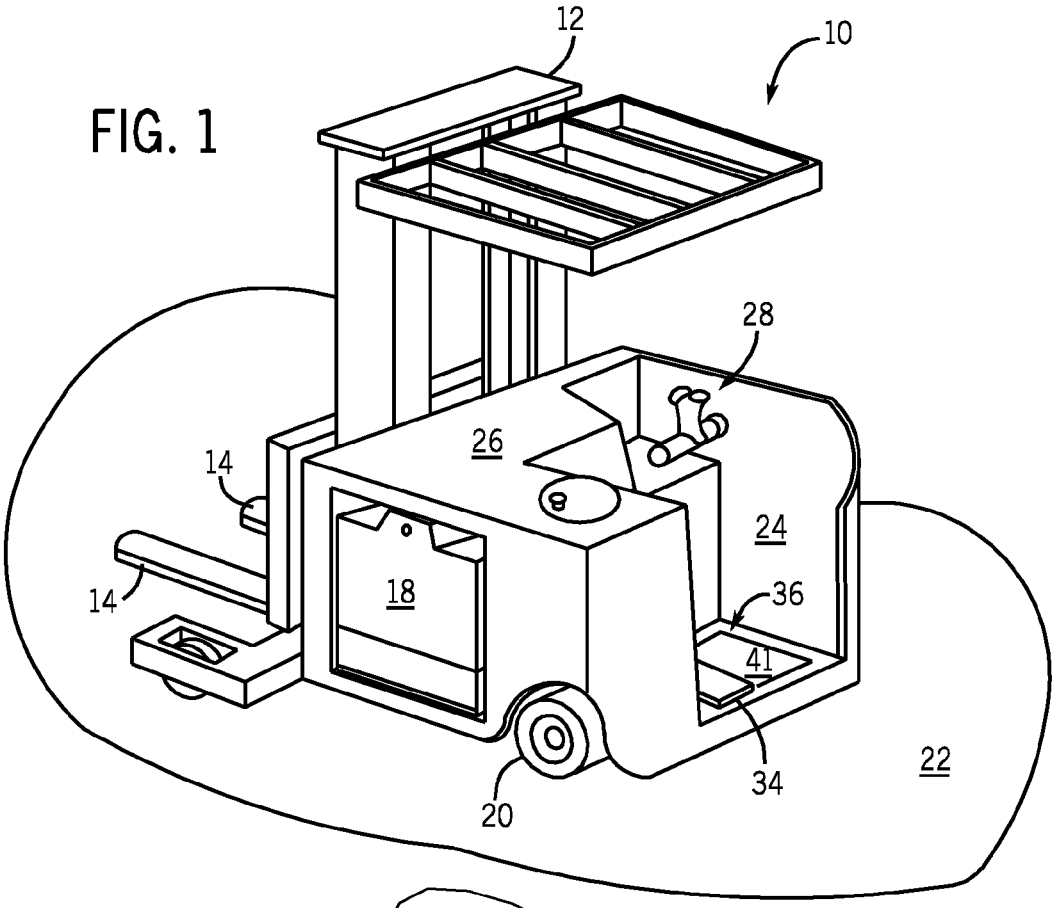
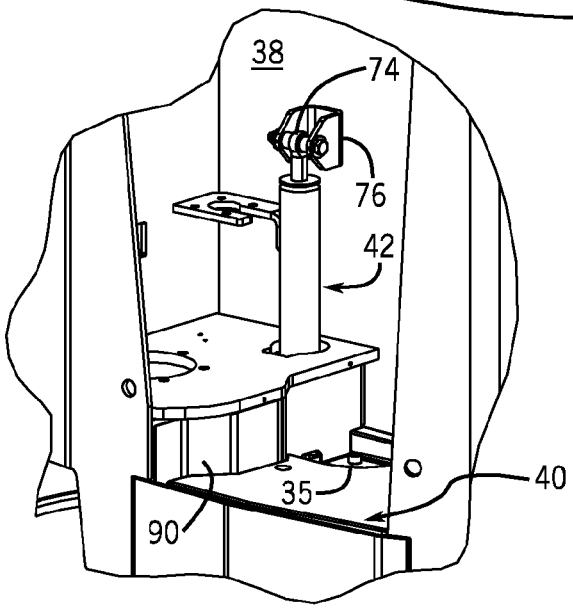
FIG. 2

OPERATOR RIDE ENHANCEMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a *continuation reissue of application Ser. No. 16/813,414, filed Mar. 9, 2020, which is a continuation reissue of application Ser. No. 15/476,767, filed Mar. 31, 2017, which is now U.S. Reissue Pat. No. RE47,899, which is an application for reissue of U.S. Pat. No. 8,991, 904, which is a* continuation of U.S. patent application Ser. No. 13/091,237 filed on Apr. 21, 2011, *which is now U.S. Pat. No. 8,616,603,* which claims priority to U.S. provisional application No. 61/327,434 filed Apr. 23, 2010, [both] *all* of which are hereby incorporated by reference as if fully set forth herein.

STATEMENT REGARDING FEDERALLY SPONSORED RESEARCH

Not applicable.

BACKGROUND

The present disclosure relates generally to an operator ride enhancement system. More particularly, the disclosure describes an operator ride enhancement system incorporating a counterweight platform that is moveably coupled to a vehicle frame and configured to isolate an operator supported on the counterweight platform from disturbances of the vehicle.

Repeatedly subjecting a vehicle operator to disturbances (e.g., undulations, etc.) that occur during operation of the vehicle can result in the operator becoming uncomfortable. For example, the operator of a lift truck often stands on an operator platform while controlling the lift truck. Various disturbances occur, for instance, as the lift truck travels along a floor, over expansion joints, across dock plates, and manipulates the forks. Increased focus on efficiency, through increased production, has resulted in faster moving lift trucks, which exacerbates the occurrence and amplitude of the disturbances. Isolating the operator from these and other disturbances may increase operator comfort, especially over prolonged periods of operation.

One technique that has been explored to suppress disturbances involves suspending or supporting the typical, standard platform with a variety of energy absorbing devices (e.g., springs, viscous dampers, rubber bumpers, etc.). However, many of these arrangements are dependent upon configurations that require adjusting or calibrating the energy absorbing devices to accommodate operators of different mass (and hence, weight). Furthermore, these devices often result in increased complexity and maintenance. The remaining less sophisticated arrangements have limited capability to attenuate the transmission of the disturbances over a range of frequencies and amplitudes.

In light of at least the above considerations, a need exists for reducing disturbances experienced by a vehicle operator to enhance the operator's ride on the vehicle.

SUMMARY

An operator ride enhancement system that is coupleable to the frame of a vehicle includes a counterweight platform moveably coupled to the frame, and a resilient member engaged with the frame and the counterweight platform. The mass of the counterweight platform is configured to be approximately at least equal to a total mass supported by the counterweight platform during operation of the vehicle. The operator ride enhancement system attenuates and/or inhibits movement of the counterweight platform during operation of the vehicle.

In one aspect, an operator ride enhancement system for use in a vehicle having a frame, comprises a counterweight platform defining a mass, the counterweight platform is coupled to the frame for pivotal movement about an axis. A resilient member is engaged with the frame and the counterweight platform to attenuate movement of the counterweight platform about the axis. A control member is engaged with the frame and the counterweight platform to inhibit movement of the counterweight platform along the axis. The mass of the counterweight platform is configured to be approximately at least equal to a total mass supported by the counterweight platform during operation of the vehicle.

In another aspect, an operator ride enhancement system for use in a vehicle having a frame and defining an operator compartment, comprises a counterweight platform defining a mass, the counterweight platform is moveably coupled to the frame at least partially within the operator compartment. A resilient member is engaged with the frame and the counterweight platform. The mass of the counterweight platform is configured to be approximately at least equal to a total mass supported by the counterweight platform during operation of the vehicle. The mass of the counterweight platform and the resilient member are configured to attenuate disturbances transmitted through the frame to the counterweight platform.

These and still other aspects of the invention will be apparent from the description that follows. In the detailed description, preferred example embodiments will be described with reference to the accompanying drawings. These embodiments do not represent the full scope of the invention; rather, the invention may be employed in many other embodiments. Reference should therefore be made to the claims for determining the full breadth of the invention.

BRIEF DESCRIPTION OF THE DRAWINGS

FIG. 1 is a rear isometric view of an example vehicle incorporating an operator ride enhancement system.

FIG. 2 is a partial isometric view of a portion of an example operator ride enhancement system.

DETAILED DESCRIPTION OF THE PREFERRED EXAMPLE EMBODIMENTS

Figure 3:
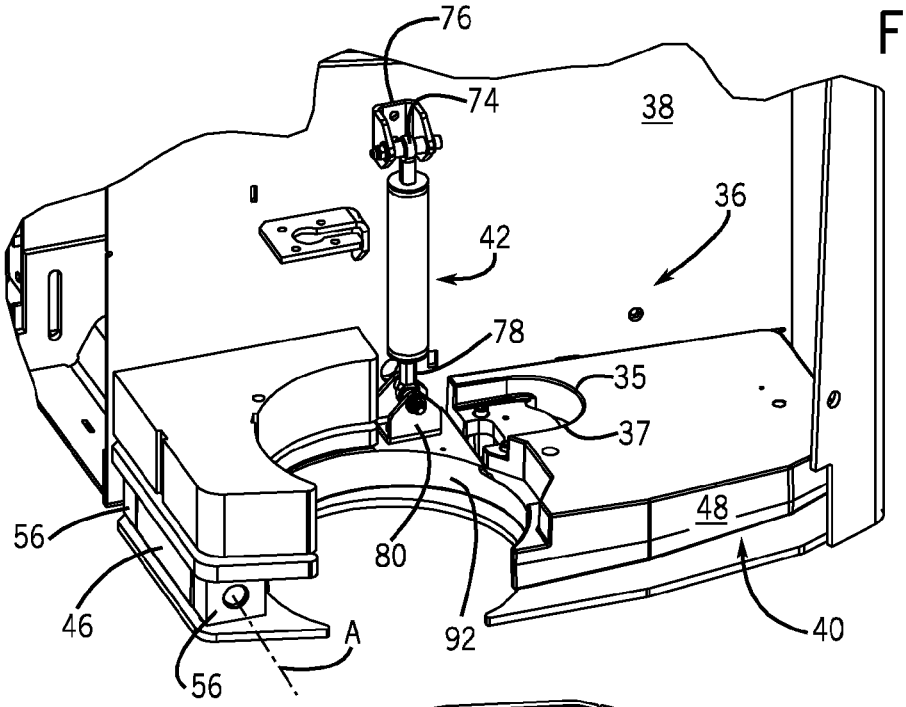
FIG. 3 is a partial isometric view of the example operator ride enhancement system of FIG. 2.
Figure 4:
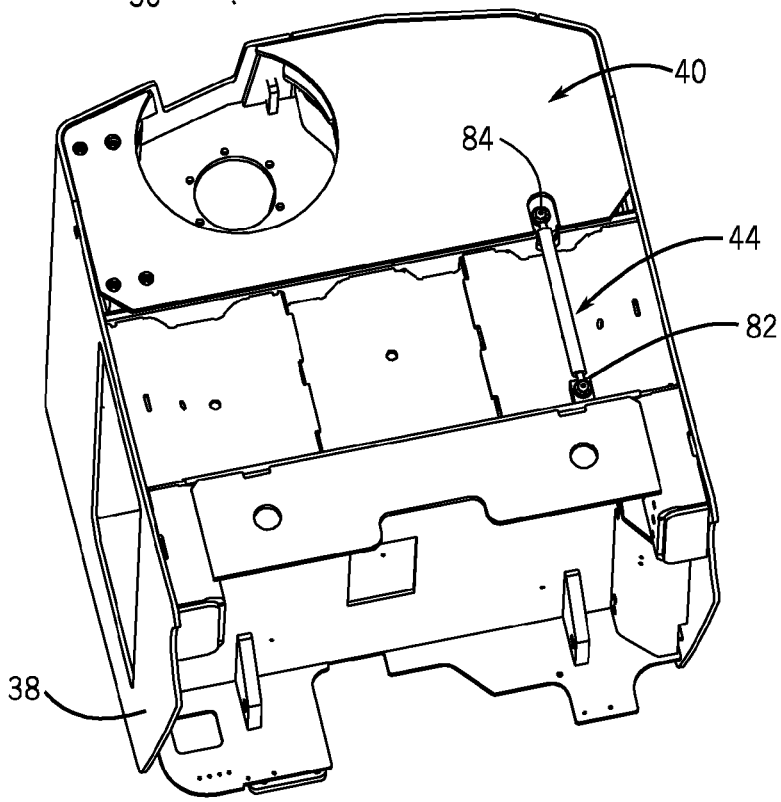
FIG. 4 is a simplified isometric view of a portion of the example operator ride enhancement system of FIG. 2.

Several example embodiments of an operator ride enhancement system are described and illustrated in the context of a material handling vehicle commonly referred to as a lift truck. However, given the benefit of this disclosure, one skilled in the art will appreciate the various modifications that can be made to the example embodiments and the various applications in which the operator ride enhancement system may be incorporated. For instance, the operator ride enhancement system concepts described herein may be applied to other material handling vehicles as well as other devices where attenuating disturbances transmitted to an operator or coupled structure/device is beneficial. Furthermore, the terms "fore," "aft," "front," "back," "side," "top," "bottom," "up," "down," "raised," "lowered," "vertical," "horizontal," and other relative directional terms used herein are not to be limiting, but instead are used for convenience in describing the illustrated example embodiments.

An example material handling vehicle, in the form of a lift truck 10 ("lift truck"), is illustrated generally in FIG. 1. The lift truck 10 includes a mast 12 operatively coupled to the fore end of the lift truck 10 and capable of raising and lowering a set of forks 14 attached to the mast 12. A pair of drive wheels (not shown) are rotationally coupled to the fore end of the lift truck 10 and operationally engaged with a drive system (not shown), such as one or more electric motors. When the lift truck 10 incorporates an electrical drive system, the lift truck 10 includes a battery compartment that houses a battery 18, as is understood by one of ordinary skill in the art. In the example illustrated in FIG. 1, a steering wheel 20 operates in conjunction with the drive wheels to allow the lift truck 10 to travel along a floor 22.

An operator compartment 24 is located near the aft end of the lift truck 10 and includes a console 26 having operator controls 28 that allow an operator to control the movement of the lift truck 10, the mast 12, and the forks 14. The operator compartment 24 can also include an armrest and a backrest to accommodate an operator during use of the lift truck 10.

When an operator enters the operator compartment 24, the operator steps up and into the operator compartment 24. In one embodiment, a pedal switch 34 is positioned within the operator compartment 24, such that the location of the pedal switch 34 and operator controls 28 typically result in the operator assuming a left-facing stance. If an armrest and/or backrest are provided, preferably, the operator's back is proximate the backrest and the operator's right arm engages the armrest while the operator is in the left-facing stance.

With continued reference to FIG. 1 and additional reference to FIGS. 2-5 an example embodiment of an operator ride enhancement system 36 is shown moveably coupled to a frame 38 of the lift truck 10. The "frame" is defined broadly to include any structure of the lift truck 10 suitable to support the mass of and the mass supported by the operator ride enhancement system 36 during use.

Figure 5:
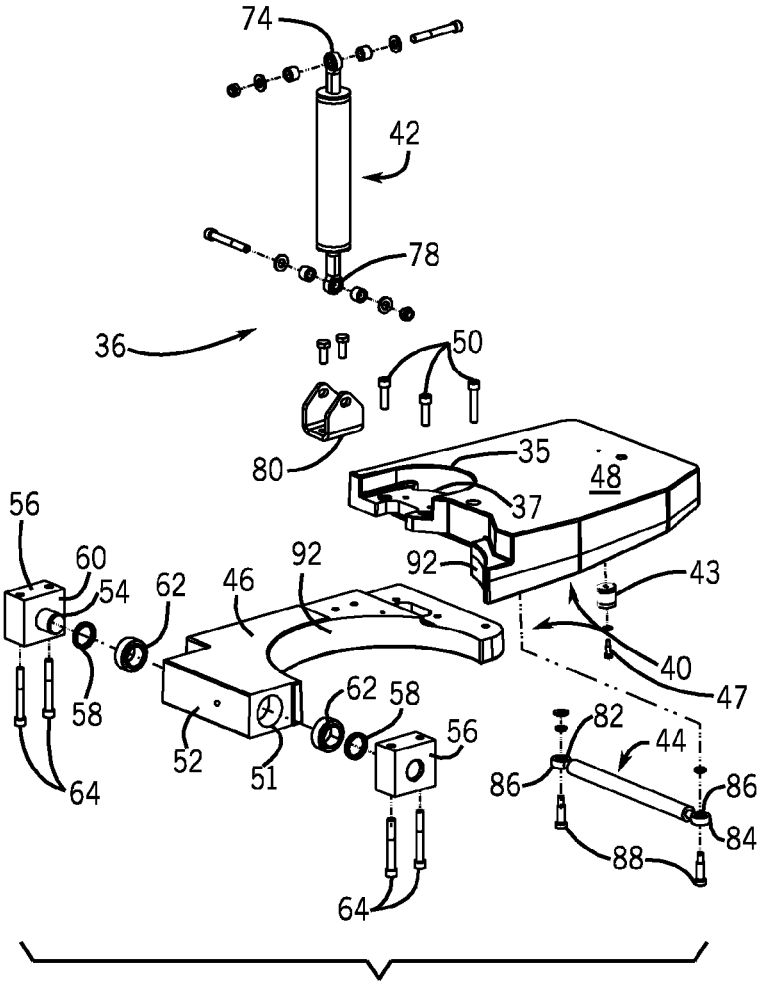
FIG. 5 is an isometric exploded view of the operator ride enhancement system of FIG. 3.

In one example embodiment, the operator ride enhancement system 36 includes a counterweight platform 40, a resilient member 42, and a control member 44. The counterweight platform 40 is shown constructed of a hinged portion 46 and a platform portion 48 that partially overlap and are coupled via fasteners 50, which may make assembly and installation easier as the mass of the counterweight platform 40 may be cumbersome to manipulate. In other forms, the counterweight platform 40 may be formed (e.g., cast, machined, molded, and the like) as a unitary body. The counterweight platform 40 of the example embodiment shown in FIG. 5 is cast from iron (such as grey iron, ductile iron 85-55-06, or may alternatively be made of ASTM A36 grade steel alloy or any other suitable material having sufficient density to provide the requisite counterweight) and has a weight on the order of three hundred and fifty pounds. In one form, the counterweight platform 40 includes a base made of low carbon steel that is approximately three inches thick with a thin angled top plate secured to the base (having a total weight of approximately three hundred and eighty-five pounds). In a preferred form, the counterweight platform 40 is tapered such that the interface between the counterweight platform 40 and the operator is angled down relative to horizontal at approximately 2° to 4°. Additionally, the underside of the counterweight platform 40 may be angled up relative to horizontal at approximately 2° to 4° to accommodate downward, pivotal movement of the counterweight platform 40.

By providing a counterweight platform 40 having a mass in excess of the mass required to perform the structural function of supporting a weight range of operators (e.g., between approximately one hundred pounds and three hundred and fifty pounds), the mass of the counterweight platform 40 reduces the influence that the total mass supported by the counterweight platform 40 during use (including the mass of the operator) has on the overall dynamic response of the operator ride enhancement system 36. For instance, the variable mass of each operator (i.e., different operators may define different masses) has a diminished impact on the dynamic response of the operator ride enhancement system 36 as the mass of the operator represents a reduced percentage of the overall mass (i.e., the sum of the mass of the counterweight platform 40 and the total mass supported by the counterweight platform 40). Therefore, the attenuation characteristics of the operator ride enhancement system 36 may be designed to maintain the typical dynamic response of the operator ride enhancement system 36 within a predefined range of characteristics (e.g., frequency range, maximum amplitude, maximum cycles post-disturbance, etc.) given that the mass of the counterweight platform 40 dominates the dynamic response. The mass of the counterweight platform 40 may be equal to or greater than the expected mass of the range of operators (e.g., approximately forty-five kilograms to approximately one hundred and sixty kilograms), about equal to or greater than the mass of a particular operator, or preferably approximately at least equal to the total mass supported by the counterweight platform 40.

Returning to the counterweight platform 40, the hinged portion 46 includes a pair of axially aligned bores 51 at a hinged end 52. Each bore 51 receives a post 54 that extends from a respective mounting block 56. A spacer 58 is slid over each post 54 and positioned against a bearing face 60 of the mounting block 56. A spherical bearing 62 is then fit over each post 54 and fit within the respective bore 51. The mounting blocks 56 are secured to the frame 38 via fasteners 64 such that the hinged portion 46 and coupled platform portion 48 can pivot about an axis A (shown generally in FIG. 3) that is substantially parallel with a fore-aft axis of the lift truck 10. In preferred forms, the pivot arm (i.e., the approximately perpendicular distance from the axis A to the distal end of the counterweight platform 40) is as long as possible to more closely approximate linear, vertical movement of the operator supported on the counterweight platform 40 as it pivots through a relatively acute arc (e.g., 3°-5° andtypically less than 3°).

It is preferred, in some configurations, to have the substantially horizontal axis A about which the counterweight platform 40 pivots be oriented substantially parallel with the fore/aft orientation of the lift truck 10 to minimize the inertial disturbances that may occur about an axis that is oriented more perpendicular to the fore/aft orientation of the lift truck 10. If the axis A is perpendicular to the fore/aft orientation of the lift truck 10, the counterweight platform 40 may have a tendency to rotate about the perpendicular axis during acceleration and deceleration of the lift truck 10, thus a more parallel orientation of the axis A reduces the tendency of the counterweight platform 40 during acceleration and deceleration to rotate about the axis A. Other orientations of the axis A are available depending upon the particular application requirements for the operator ride enhancement system 36.

With continued reference to FIGS. 1-5, the example embodiment of the operator ride enhancement system 36 includes the resilient member 42. The example resilient member 42 may be one or more helical springs captured in a cylindrical housing between a fixed end plate and a plunger slideably positioned within the cylindrical housing. The plunger may also function as a dampener member by frictionally engaging the cylindrical housing as it slides. Alternatively, the plunger may divide the cylindrical housing into two chambers such that a fluid is urged through an orifice between chambers as the plunger slides within the cylindrical housing. One example embodiment of the resilient member 42 may include that described in U.S. Pat. No. 6,773,002, which is hereby incorporated by reference as if fully set forth herein. The resilient member 42 may further include an auxiliary spring at the extreme end of the stroke of the plunger, thereby providing additional resilience for severe disturbances. In addition, as shown in FIG. 5, a bumper 43 may be secured (e.g., via a fastener 47) to the underside of the counterweight platform 40. The example bumper 43 is elastomeric and configured to establish a flexible interface between the frame 38 and the underside of the counterweight platform 40 in the event that the counterweight platform 40 over pivots about the axis A.

The resilient member 42 is engaged with the frame 38 and the counterweight platform 40 to at least partially attenuate disturbances imparted through the frame 38 to the counterweight platform 40 when the lift truck 10 is in use (e.g., as the lift truck 10 travels along the floor 22, over an expansion joint, along a loading dock ramp, into a storage container, and the like). Specifically, the example resilient member 42 includes a first end 74 attached to the frame 38 via a clevis 76 extending from the frame 38, and a second end 78 attached to the counterweight platform 40 via a clevis 80 extending, in the example embodiment, from the hinged portion 46 of the counterweight platform 40.

The resiliency (e.g., spring constant, elasticity, and the like) of the resilient member 42 is preferably selected in combination with the mass of the counterweight platform 40 to control the maximum static deflection of the counterweight platform 40 as it pivots about the axis A, and to reduce the transmission of disturbances to the operator supported on the counterweight platform 40. Other considerations, such as the natural frequency of the operator ride enhancement system 36 and the maximum dynamic deflection of the counterweight platform 40, may also be factors in selecting/configuring a resilient member 42 for a specific application. In one example form, a resilient member includes a coil spring having preload of approximately 1025 Newtons (approximately 230 pounds force) and a spring rate of approximately 3300 Newtons per centimeter (approximately 1888 pounds force per inch).

In the example shown in FIGS. 1-5, the control member 44 inhibits movement of the counterweight platform 40 in the fore/aft direction generally along the axis A. The control member 44 may reduce undesired movement of the counterweight platform 40 in the fore/aft orientation during acceleration and deceleration of the lift truck 10. Specifically, the control member 44 includes a first end 82 engaged with the frame 38 and a second end 84 engaged with the counterweight platform 40 to inhibit movement of the counterweight platform 40 along the axis A (i.e., along the length of the control member 44). In the example shown best in FIGS. 4 and 5, the control member 44 is in the form of a rod that may be adjustable in length and include a knuckle 86 at the first end 82 and another knuckle 86 at the second end 84, with fasteners 88 securing the knuckles 86. Other forms of the control member 44 may used, such as a beam, a channel, a rigid damper, stiff spring, guide roller(s), and the like without departing from the scope of the invention.

In some applications, the operator ride enhancement system 36 utilizes the inherent damping within the system (e.g., frictional losses due to compressing the spring in the resilient member 42, frictional losses related to the spherical bearings 62, and the like), and therefore no distinct dampener member is required. In other instances, for example, the resilient member 42 may further include a dampener member (e.g., a hydraulic shock absorber), separately or in combination with the resilient member 42, to provide the desired dampening of the counterweight platform 40 and operator supported thereon. Dampener members integrated into the operator ride enhancement system 36 are preferably configured to return the counterweight platform 40 to a neutral (i.e., static) position in a relatively short time post-disturbance (e.g., within two cycles of the counterweight platform 40) while still providing the application-specific disturbance-attenuation capability.

As best shown in FIG. 2, during use, the platform portion 48 of the counterweight platform 40 is positioned generally within the bounds of the operator compartment 24. A hinge shield 90 provides a general separation between the platform portion 48 and the hinged portion 46. In the preferred form, and in accordance with maximizing the mass within the available space, the counterweight platform 40 includes an arcuate surface 92 that provides clearance for the steering wheel 20 (not shown in FIGS. 2-5 for clarity). In addition, the platform portion 48 can include a recess 35 sized to support and accommodate the pedal switch 34 (shown in FIG. 1); the recess 35 may also include a drain opening 37 to reduce fluid retention near the counterweight platform 40 and around the pedal switch 34. The operator ride enhancement system 36 shown in FIG. 1 may further include a covering in the form of a resilient mat 41 upon which an operator stands when within the operator compartment 24.

As a result of the operator ride enhancement system 36, disturbances input to the frame 38 of the lift truck 10 are at least partially attenuated due to the configuration and arrangement of the various components of the operator ride enhancement system 36. Furthermore, as noted above, the mass of the counterweight platform 40 minimizes the dynamic influence resulting from operators of varying mass.

Figure 6:
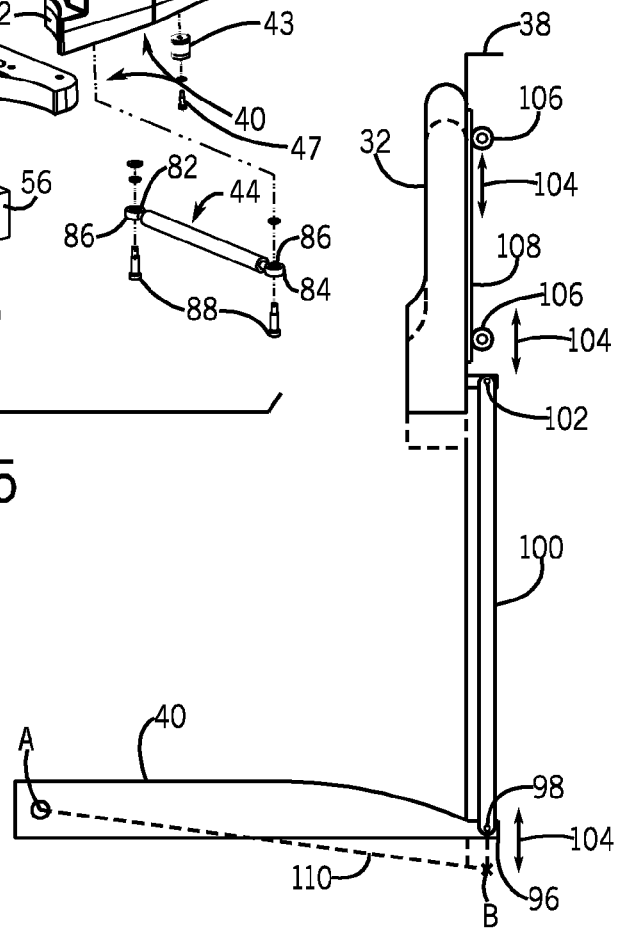
FIG. 6 is a simplified side view of a portion of an alternative example operator ride enhancement system showing an example operator backrest configuration.

Turning to FIG. 6, a simplified alternative arrangement of the counterweight platform 40 and a backrest 32 are shown. In the illustrated configuration, a distal end 96 of the counterweight platform 40 is pivotally coupled to a lower end 98 of a link 100 that extends between the counterweight platform 40 and the backrest 32. Specifically, an upper end 102 of the link 100 is pivotally coupled to the backrest 32. The backrest 32 is slidable up and down (shown by arrows 104), such as by rollers 106 extending from the backrest 32 and engaged with a track 108 fixed to the frame 38. As the counterweight platform 40 deflects and/or pivots about the axis A (shown simplistically by dashed line 110), the distal end 96 of the counterweight platform 40 and coupled lower end 98 of the link 100 are moved down to point B. This results in the backrest 32 translating downward accordingly such that relative movement between the operator, counterweight platform 40, and backrest 32 is minimized.

Figure 7:
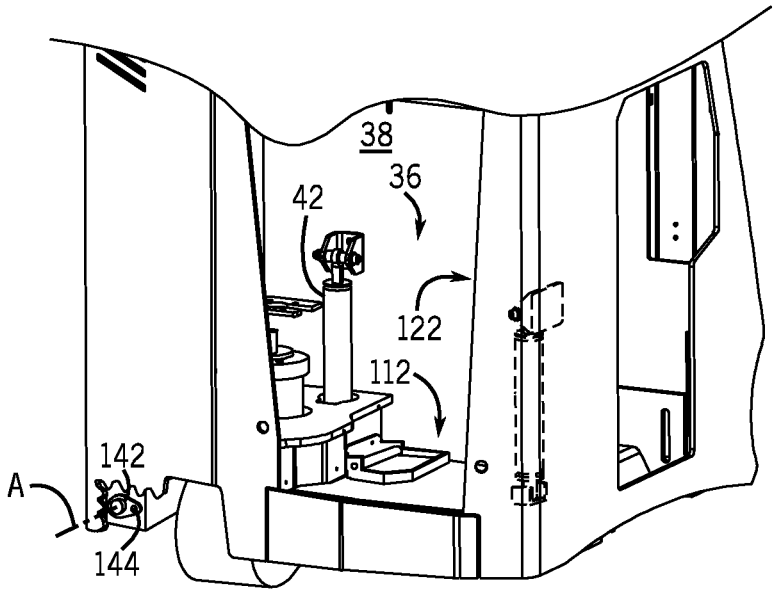
FIG. 7 is a partial rear isometric view of another example operator ride enhancement system.
Figure 8:
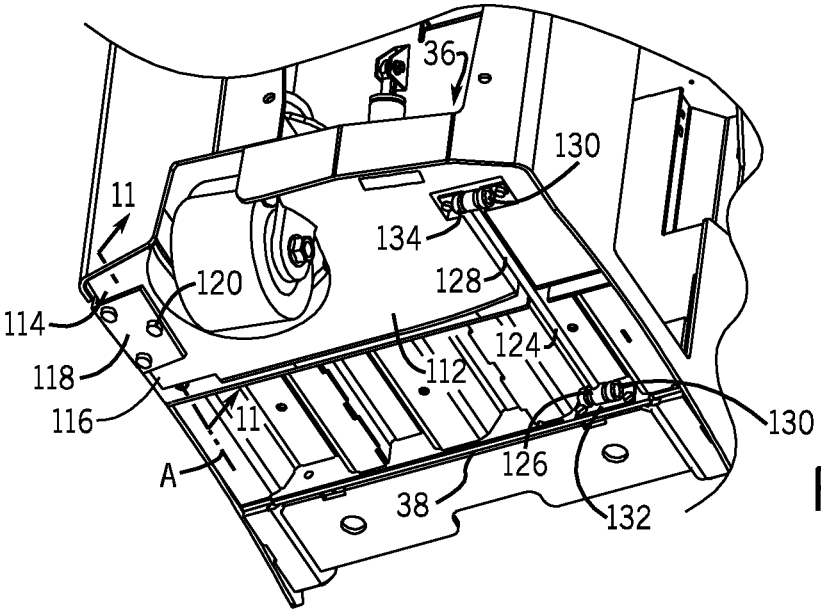
FIG. 8 is a partial rear isometric view of the operator ride enhancement system of FIG. 7.
Figure 9:
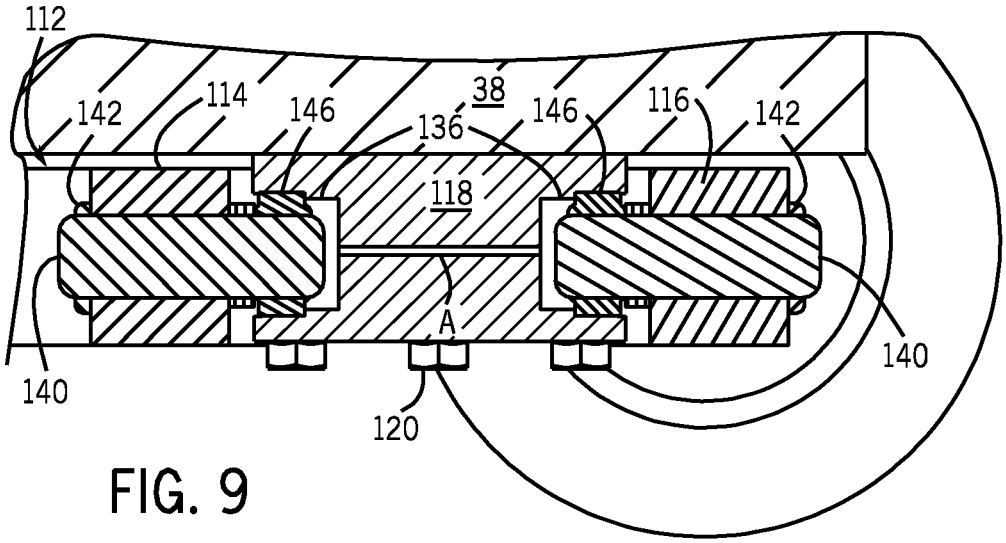
FIG. 9 is a partial section view along line 11-11 of FIG. 8.

Another example embodiment of an operator ride enhancement system 36 is generally illustrated in FIGS. 7-9. The operator ride enhancement system 36 incorporates a counterweight platform 112 formed (e.g., machined) of a single body and having a pair of arms 114, 116 hinged to a centralized mounting block 118. The mounting block 118 is fixed to the frame 38 via fasteners 120 (best shown in FIGS. 8 and 9). Additionally, the operator ride enhancement system 36 includes a pair of resilient members 42 having a first end engaged to the counterweight platform 112 and a second end mounted to the frame 38. One of the resilient members may be mounted as described in reference to FIGS. 1-5, alternatively, or in addition, the resilient member 42 may be mounted to a side portion 122 of the frame 38. Thus, as illustrated, the resilient member(s) 42, similar to the other components (e.g., dampener member(s), control member(s), etc.), may be mounted in a variety of locations relative to the counterweight platform 40 (and axis A), but is preferably mounted to not interfere with the operator. Furthermore, the resilient member 42 is designed to account for the static and dynamic forces acting on the resilient member 42 given the particular mounting location.

A control member 124 (shown in FIG. 8) is preferably adjustable in length and includes a first end 126 pivotally coupled to the frame 38 and a second end 128 pivotally coupled to the counterweight platform 112. A rubber bushing is preferably seated in the first end 126 and second end 128 of the control member 124. A fastener 130 secures the first end 126 to a clevis 132 that is in turn fastened to the frame 38. Also, another fastener 130 secures the second end 128 to another clevis 134 that is in turn fastened to the counterweight platform 112. Again, the control member 124 inhibits movement of the counterweight platform 112 generally in a direction along a pivot axis A about which the counterweight platform 112 may rotate.

With specific reference to FIGS. 7 and 9, the counterweight platform 112 is shown pivotally coupled to the frame 38 via mounting block 118. The mounting block 118 defines a pair of aligned bores 136. Each bore 136 receives a shaft 138 extending through an opening 140 in respective arms 114, 116 of the counterweight platform 112. The outer end of the shaft 138 includes a tab 142 radially extending from the shaft 138 that prevents the shaft 138 from sliding through the opening 140 in the respective arm 114, 116. As best shown in FIG. 7 a fastener 144 extends through an opening in the tab 142 and is fastened to the respective arm 114, 116, thereby securing the shaft 138 to the respective arm 114, 116 and in the respective bore 136.

The opposite end of the shafts 138 accept a radial spherical bearing 146 that is inserted into the respective bore 136 in the mounting block 118. Therefore, the counterweight platform 112 is hinged to the mounting block 118, and hence frame 38, such that the counterweight platform 112 may pivot about the axis A. As with the previous example operator ride enhancement system 36, a dampener member (e.g., a hydraulic shock absorber) may be engaged between the frame 38 and the counterweight platform 112 to attenuate disturbances input to the frame 38, thereby ultimately reducing the transmission of the disturbance to the counterweight platform 112 and operator supported thereon.

Figure 10:
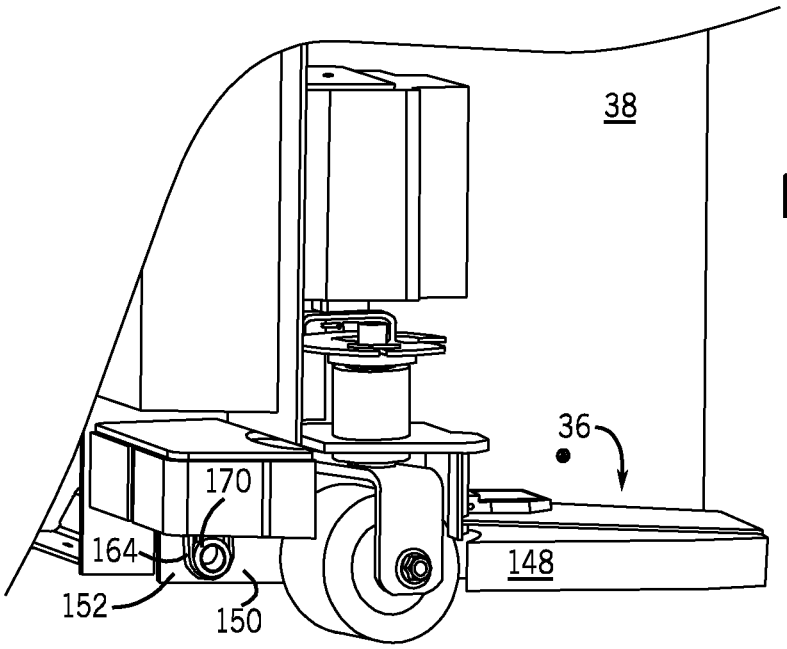
FIG. 10 is a partial isometric view of a further example operator ride enhancement system.
Figure 11:
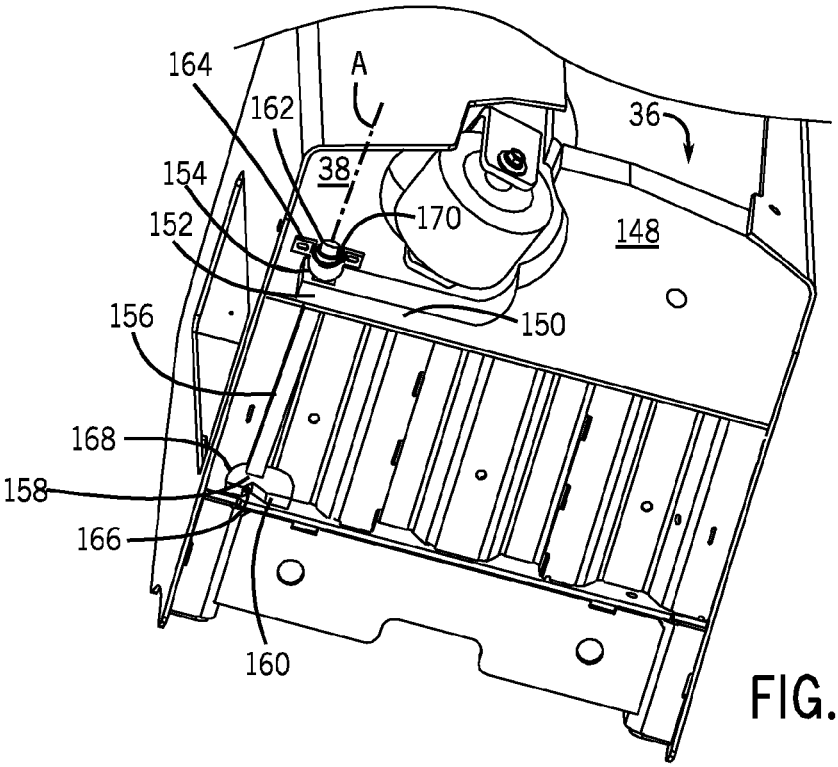
FIG. 11 is a partial isometric view of the operator ride enhancement system of FIG. 10.

Another example embodiment of an operator ride enhancement system 36 is illustrated generally in FIGS. 10 and 11. In this arrangement, a counterweight platform 148 includes a single arm 150 that is hinged to the frame 38 at a distal end 152. Specifically, the arm 150 includes a square opening 154 through which a resilient member in the form of a square torsion bar 156 is rotatably interlocked, such that pivoting the counterweight platform 148 about the axis A applies a rotational torque to the torsion bar 156. Given that one end 158 of the torsion bar 156 is rotatably fixed to the frame 38 via a preload member 160 and the opposite end 162 of the torsion bar 156 is rotatably captured to the frame 38 via a bracket 164, the counterweight platform 148 is pivotally coupled to the frame 38.

The preload member 160 is fixed to the torsion bar 156 and rotatably coupled to the frame 38 such that rotating the preload member 160 alters the static location of the counterweight platform 148. For instance, the preload member 160 includes an adjustment bolt 166 that extends into and through a threaded opening in the preload member 160. A tip 168 of the adjustment bolt 166 bears against the frame 38 urging the torsion bar 156 to rotate about the axis A in a direction to move the counterweight platform 148 upward, and thus reducing the static deflection from horizontal.

A dampener member in the form of an elastomeric bushing 170 frictionally engages the end 162 of the torsion bar 156 and is supported by the bracket 164. As a result, the elastomeric bushing 170 at least partially attenuates the disturbances imparted through the frame 38 to the counterweight platform 148 and helps reduce the oscillations of the counterweight platform 148 that may occur in response to the disturbances. Of course, the dampener member may include a variety of configurations, such as a hydraulic damper, a pneumatic damper, a magneto-rheological damper, an electro-rheological damper, and a friction damper. One skilled in the art, given the benefit of this disclosure will appreciate the variety of dampener member devices and arrangements.

Figure 12:
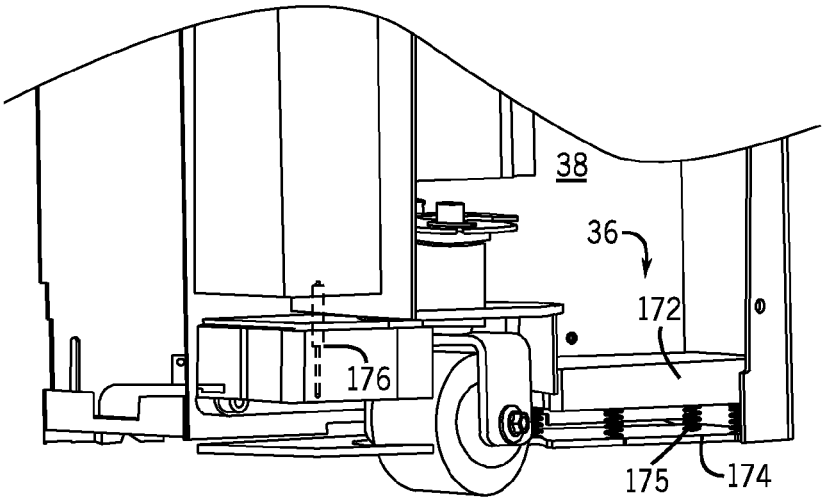
FIG. 12 is a partial isometric view of yet a further example operator ride enhancement system.

In another example operator ride enhancement system 36 illustrated in FIG. 12, a counterweight platform 172 may be hinged to the frame 38 similar to that shown and described with reference to FIGS. 10 and 11, but may also include resilient members in the form of compression springs 175. The springs 175 are illustrated as being positioned between the counterweight platform 172 and a subfloor 174 that is secured to the frame 38. Additionally, a dampener member 176 (shown in simplified form) may be engaged between the counterweight platform 172 and the frame 38 to again inhibit movement of the counterweight platform 172 during use.

Figure 13:
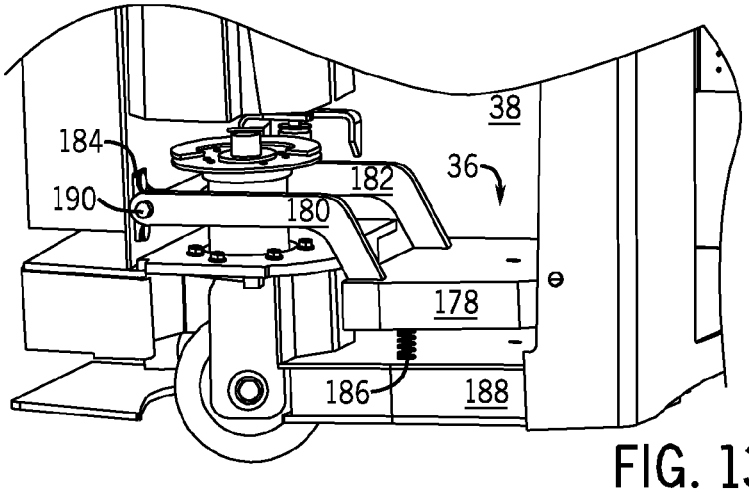
FIG. 13 is a partial isometric view of another example operator ride enhancement system.

Turning next to FIG. 13, another alternative example operator ride enhancement system 36 is illustrated. This embodiment includes a counterweight platform 178 having a pair of arms 180, 182 extending upward and away from the counterweight platform 178 toward a pair of mounting blocks 184 that are secured to the frame 38. A resilient member, in the form of one or more springs 186 is again positioned between the counterweight platform 178 and a subfloor 188. Given the benefit of this disclosure, one skilled in the art will appreciate that the resilient member may alternatively be any other suitable device, such as an extension spring, a torsion spring, an air spring, and an elastomeric spring.

Additionally, or alternatively, a torsion bar 190 may be fixed to the frame 38 and one or more of the arms 180, 182 such that rotating the counterweight platform 178 about the axis A established by the mounting blocks 184 torques the torsion bar 190.

Figure 14:
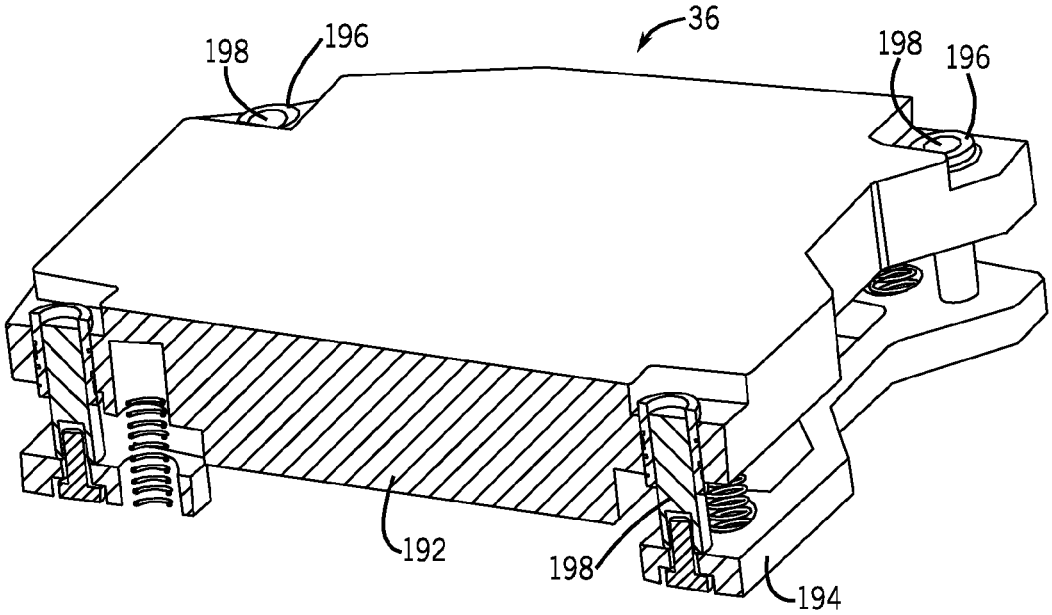
FIG. 14 is an isometric view of a further example operator ride enhancement system removed from a vehicle.

A further example operator ride enhancement system 36 is illustrated in FIG. 14. In this embodiment, the operator ride enhancement system 36 includes a counterweight platform 192 that is not hinged to the frame 38, but is instead supported by a sub-frame 194 that is fixed to the frame 38 (not shown). The counterweight platform 192 includes a series of guides in the form of vertical cylindrical passageways 196 into which guide pins 198 (extending upward from the sub-frame 194) engage. The cylindrical passageways 196 may be lined with bearings to aid relative movement of the counterweight platform 192. As a result, the counterweight platform 192 can translate vertically along the axis of the guide pins 198 during use in response to disturbances, as the guide pins 198 are slideably received in the vertical cylindrical passageways 196.

Resilient members in the form of coil springs 200 are located between the sub-frame 194 and the counterweight platform 192 to at least partially attenuate disturbances imparted through the frame 38 to the counterweight platform 192. A dampener member in the form of a hydraulic shock absorber (not shown) may also be secured to the counterweight platform 192 with an upper end of the dampener member fixed to the frame 38 (not shown). As a result, the hydraulic shock absorber at least partially attenuates the disturbances imparted through the frame 38 to the counterweight platform 192.

Figure 15:
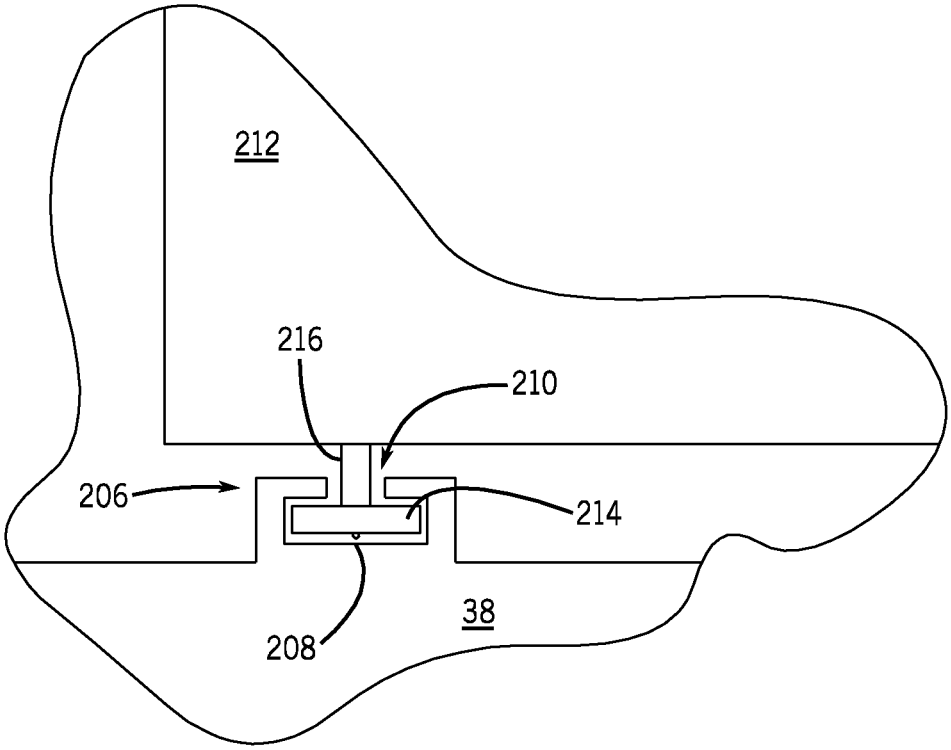
FIG. 15 is a partial top view of an additional example guide.

An alternative guide is illustrated in FIG. 15. The guide 206 generally comprises a channel 208 fixed to (or integral with) the frame 38 and a carriage 210 fixed to a counterweight platform 212. The carriage 210 includes a roller 214 rotatably captured on a spindle 216. As such, the carriage 210 (and thus counterweight platform 212) is captured within and slides along the channel 208 as the roller 214 rolls.

The above-described operator ride enhancement systems may require application specific adjustments to achieve desired levels of disturbance attenuation. Several general considerations may aid the design and development of a suitable operator ride enhancement system given particular application requirements. For instance, when considering a resilient member, higher spring rates are generally less sensitive to variances in operator mass and result in less static deflection of a counterweight platform supporting a mass. In some applications, a balance must be struck between the natural frequency, static deflection, dynamic deflection, spring rate, and counterweight platform mass. The counterweight platform mass is often restricted by packaging limitations; however, other options for increasing the mass of the counterweight platform may include rearranging various vehicle components, such as motors, controllers, hydraulics, etc. to alter the dynamics of the operator ride enhancement system. As a specific example, a battery of a fork truck may be structurally coupled to a counterweight platform, thereby substantially increasing the mass of the counterweight platform as compared to the mass of an operator, further reducing the impact that the mass of an operator has on the dynamic response of the operator ride enhancement system.

While there has been shown and described what is at present considered the preferred embodiments of the invention, it will be obvious to those skilled in the art that various changes and modifications can be made, given the benefit of this disclosure, without departing from the scope of the invention defined by the following claims.

I claim:

[1. An operator ride enhancement system for use in a vehicle having a frame, the operator ride enhancement system comprising:

a counterweight platform pivotally coupled to the frame of the vehicle about an axis and configured to support an operator engaging the operator ride enhancement system, the counterweight platform having a counterweight platform mass that is greater than approximately forty-five kilograms;

a resilient member engaged with the frame and the counterweight platform to attenuate movement of the counterweight platform about the axis; and a control member engaged with the frame and the counterweight platform to inhibit movement of the counterweight platform along the axis.]

[2. The operator ride enhancement system of claim 1, wherein:

the axis is oriented substantially parallel with a fore-aft axis of the vehicle; and the control member is oriented substantially parallel with the fore-aft axis of the vehicle.]

[3. The operator ride enhancement system of claim 1, wherein the counterweight platform comprises:

a hinged portion pivotally coupled to the frame; and a platform portion coupled to the hinged portion;

wherein the platform portion is tapered toward a distal end that is opposite to the hinged portion.]

[4. The operator ride enhancement system of claim 1, wherein the counterweight platform is configured to at least partially surround a steering wheel of the vehicle.]

[5. The operator ride enhancement system of claim 1, wherein the counterweight platform mass is at least one hundred and sixty kilograms.]

[6. An operator ride enhancement system for use in a vehicle having a frame and defining an operator compartment, the operator ride enhancement system comprising:

a counterweight platform movably coupled to the frame of the vehicle and configured to support an operator within the operator compartment engaging the operator ride enhancement system, the counterweight platform having a counterweight platform mass that is greater than approximately forty-five kilograms to reduce the influence that an operator mass of the operator has on a dynamic response of the operator ride enhancement system; and a resilient member engaged with the frame and the counterweight platform to attenuate movement of the counterweight platform and the operator supported by the counterweight platform.]

[7. The operator ride enhancement system of claim 6, wherein the counterweight platform is pivotally coupled to the frame for pivotal movement about an axis.]

[8. The operator ride enhancement system of claim 7, further comprising a control member engaged with the frame and the counterweight platform to inhibit movement of the counterweight platform along the axis.]

[9. The operator ride enhancement system of claim 6, wherein the resilient member is a torsion member having a first end rotatably fixed to one of the frame and the counterweight platform and a second end rotatably fixed to the other of the frame and the counterweight platform.]

[10. The operator ride enhancement system of claim 9, further comprising:

a preload member proximate the first end of the torsion member; and a dampener member engaged with the frame and the second end of the torsion member to at least partially attenuate the disturbances transmitted through the frame to the counterweight platform.]

[11. The operator ride enhancement system of claim 6 further comprising at least one guide coupled to the frame and engaged with the counterweight platform to allow the counterweight platform to translate along the guide in response to the disturbances.]

[12. The operator ride enhancement system of claim 6, further comprising a dampener member engaged with the frame and the counterweight platform to attenuate the disturbances transmitted through the frame to the counterweight platform.]

[13. The operator ride enhancement system of claim 6, wherein the counterweight platform mass is at least one hundred and sixty kilograms.]

[14. The operator ride enhancement system of claim 6, wherein the counterweight platform comprises:

a hinged portion coupled to the frame for pivotal movement about an axis; and a platform portion coupled to the hinged portion.]

[15. A method of attenuating disturbances transmitted between a frame of a vehicle and an operator ride enhancement system comprising a counterweight platform moveably coupled to the frame of the vehicle and configured to support an operator, the method comprising the steps of:

determining an expected minimum operator mass of the operator supported by the operator ride enhancement system; and adjusting a counterweight platform mass of the counterweight platform to be at least equal to the expected minimum operator mass.]

[16. The method of claim 15 wherein the expected minimum operator mass is approximately forty-five kilograms.]

[17. The method of claims 16 wherein the counterweight platform mass is approximately one hundred and sixty kilograms.]

*18. A vehicle comprising:*

*a frame;*

*a counterweight platform supported by the frame, the counterweight platform configured for translational movement relative to the frame and along a vertical axis; and*

*a resilient member configured to attenuate the translational movement of the counterweight platform, and a dampener member configured to inhibit the translational movement of the counterweight platform, the resilient member having a preload of approximately 1025 Newtons and a spring rate of approximately 3300 Newtons per centimeter to control the natural frequency of the counterweight platform.*

*19. The vehicle of claim 18, further including a channel and a carriage, the channel fixed to or integral with the frame, and the carriage fixed to the counterweight platform, the carriage including a roller rotatably captured within and slidable along the channel.*

*20. The vehicle of claim 19, wherein the counterweight platform is configured to surround a portion of a wheel of the vehicle to allow the counterweight platform to translate vertically relative to the wheel of the vehicle.*

*21. The vehicle of claim 20, further including a pedal switch, the pedal switch to translate with the counterweight platform.*

*22. The vehicle of claim 21, wherein the resilient member and the dampener member are engaged with the frame and the counterweight platform.*

*23. The vehicle of claim 22, wherein the resilient member is a spring and the dampener member is a shock absorber.*

*24. The vehicle of claim 18, further including a guide including a channel and a roller, the channel fixed relative to the frame, the roller coupled to the counterweight platform and received in the channel, the guide to allow the counterweight platform to translate relative to the frame in response to disturbances transmitted to the counterweight platform;*

*a pedal switch, the pedal switch to translate with the counterweight platform, the pedal switch positioned within the operator compartment; and*

*wherein the counterweight platform includes an opening to allow the counterweight platform to surround a portion of a wheel of the vehicle and translate vertically relative to the wheel.*

*25. The vehicle of claim 24, wherein the pedal switch is positioned within a recess in the counterweight platform.*

*26. The vehicle of claim 25, wherein the resilient member is a spring and the dampener member is a shock absorber.*

*27. The vehicle of claim 18, further including a drain opening in the counterweight platform.*

*28. A vehicle including an operator ride enhancement system, the vehicle comprising:*

*a frame, the frame defining a portion of an operator compartment of the vehicle, the operator compartment including operator controls, an armrest and a backrest;*

*a counterweight platform having a surface, the counterweight platform positioned within the operator compartment and being movably coupled to the frame and configured to support an operator standing on the surface within the operator compartment, the counterweight platform having a counterweight platform mass to reduce the influence that an operator mass has on a dynamic response of the counterweight platform; and*

*a resilient member, the resilient member including a first end engaged to the frame, and the resilient member including a second end engaged to the counterweight platform, the resilient member having a preload of approximately 1025 Newtons and a spring rate of approximately 3300 Newtons per centimeter to control the natural frequency of the counterweight platform.*

*29. The vehicle of claim 28, further including a guide, the guide including a channel and a carriage, the channel fixed to or integral with the frame, and the carriage fixed to the counterweight platform, the carriage including a roller captured within and slidable along the channel.*

*30. The vehicle of claim 29, wherein the counterweight platform includes a cutout to allow the counterweight platform to surround a portion of a wheel of the vehicle and translate vertically relative to the wheel.*

*31. The vehicle of claim 30, wherein the resilient member includes a spring and a shock absorber.*

*32. An operator ride enhancement system for use in a vehicle having a frame and defining an operator compartment, the operator ride enhancement system comprising:*

*a counterweight platform to be movably coupled to the frame of the vehicle, the counterweight platform to support an operator within the operator compartment, the counterweight platform having a mass to reduce the influence that an operator mass has on a dynamic response of the counterweight platform; and*

*a resilient member to attenuate movement of the counterweight platform and the operator supported by the counterweight platform, the resilient member having a preload of approximately 1025 Newtons and a spring rate of approximately 3300 Newtons per centimeter to control the natural frequency of the counterweight platform.*

*33. The operator ride enhancement system of claim 32, further including a pedal switch, the pedal switch to move with the counterweight platform, the pedal switch positioned within a recess in the counterweight platform.*

*34. The operator ride enhancement system of claim 32, further including a drain opening in the counterweight platform.*

*35. The operator ride enhancement system of claim 34, wherein the pedal switch is positioned within the operator compartment to allow an operator to assume a left-facing stance.*

*36. The operator ride enhancement system of claim 35, wherein the counterweight platform is formed as a unitary body.*

*37. The operator ride enhancement system of claim 36, wherein the resilient member includes a spring and a shock absorber.*

* * * * *